US008260283B2

(12) United States Patent
Pope et al.

(10) Patent No.: US 8,260,283 B2
(45) Date of Patent: Sep. 4, 2012

(54) COMMUNICATING CODESET INFORMATION AS PART OF A NATIVE APPLICATION

(75) Inventors: Steven M. Pope, Los Gatos, CA (US); Raymond O. Chock, San Jose, CA (US)

(73) Assignee: UEI Cayman, Inc., Cypress, CA (US)

( * ) Notice: Subject to any disclaimer, the term of this patent is extended or adjusted under 35 U.S.C. 154(b) by 689 days.

(21) Appl. No.: 12/283,947

(22) Filed: Sep. 16, 2008

(65) Prior Publication Data

US 2010/0069056 A1 Mar. 18, 2010

(51) Int. Cl.
*H04M 3/00* (2006.01)
(52) U.S. Cl. ............... 455/420; 455/418; 455/419
(58) Field of Classification Search ........... 455/418–420
See application file for complete search history.

(56) References Cited

U.S. PATENT DOCUMENTS

| | | | |
|---|---|---|---|
| 7,155,305 B2 | 12/2006 | Hayes et al. | |
| 7,230,562 B1 | 6/2007 | Provis et al. | 341/176 |
| 7,259,696 B1 | 8/2007 | Lee et al. | 341/23 |
| 7,259,710 B2 | 8/2007 | Kisliakov | |
| 2004/0075642 A1* | 4/2004 | Kisliakov | 345/156 |
| 2005/0159823 A1* | 7/2005 | Hayes et al. | 700/19 |
| 2006/0095339 A1 | 5/2006 | Hayashi et al. | 705/26 |
| 2007/0173212 A1 | 7/2007 | Mergler | |
| 2008/0201753 A1 | 8/2008 | Arling et al. | |
| 2009/0239587 A1* | 9/2009 | Negron et al. | 455/566 |

OTHER PUBLICATIONS

WIPO, International Preliminary Report on Patentability of PCT Application No. US2009/056838, Mar. 22, 2011, 7 pages.

* cited by examiner

*Primary Examiner* — Jinsong Hu
*Assistant Examiner* — Michael Nguyen
(74) *Attorney, Agent, or Firm* — Greenberg Traurig LLP

(57) ABSTRACT

A native application includes codeset information. The native application, if loaded into a cellular telephone, allows the cellular telephone and a novel associated Operational Signal Generating Device (OSGD) to be usable as a remote control device. An on-line media store provides the native application for purchase and download. A user uses the cellular telephone to download the native application into the cellular telephone. The codeset information is transferred into the OSGD. The OSGD has a mechanism for using codeset information to generate IR operational signals of the type used to control electronic consumer devices. Execution of the native application causes a keypad to appear on the cellular telephone display. If the user presses a key of the keypad, the cellular telephone detects the key press and sends a communication to the OSGD which causes the OSGD to use the codeset information to generate and transmit an appropriate IR operational signal.

16 Claims, 4 Drawing Sheets

IR ENABLED CELLULAR TELEPHONE

IR ENABLED CELLULAR TELEPHONE

COMMUNICATING CODESET INFORMATION AS PART OF A NATIVE APPLICATION

TECHNICAL FIELD

The described embodiments relate to codesets and to the generation of operational signals.

BACKGROUND INFORMATION

Manufacturers of electronic consumer devices, such as televisions, set-top cable television boxes, set-top satellite boxes, home theatre systems, radio tuners, digital video disk players, video cassette recorders, home automation systems, etc., typically supply a remote control device along with each electronic consumer device. Each such electronic consumer device to be controlled recognizes and responds to a particular set of codes transmitted by its associated remote control device. For example, one such code, if received by the electronic consumer device, may cause the device to toggle its power state. Another code, if received by the electronic consumer device, may cause the device to increase audio volume. Another code, if received by the electronic consumer device, may cause the device to decrease audio volume. Information on the entire set of these codes, along with associated protocol, timing, carrier, and/or framing information for generating an operational signal that includes a particular code, is referred to here generally as a codeset.

A first make and model of television may, for example, respond to codes of a first codeset but may not respond to codes of a second codeset, whereas a second make and model of television may respond to codes of the second codeset but not to codes of the first codeset. Due to the many different types, brands, models of electronic consumer devices in the consumer market today, there are thousands of codesets currently in use.

There is a type of remote control device commonly referred to as a universal remote control device. A universal remote control device can be programmed so that it transmits codes of one selected codeset of many codesets stored on the universal remote control device. A user, who wishes to use the universal remote control device to control a particular electronic device, typically configures the universal remote control device so that the universal remote control generates operational signals using the one codeset that is appropriate for the particular electronic consumer device to be controlled. Therefore, for the universal remote control device to be able to control any selected one of the many types of electronic consumer devices in use today, the universal remote control device is made to store a very large number of codesets. A typical universal remote control device may, for example, store more than a thousand codesets in a compressed and proprietary format. For additional information on universal remote control devices and codesets and related information, see: U.S. Pat. No. 7,230,562 and U.S. Pat. No. 7,259,696 (the entire contents of each of these two patent documents is incorporated herein by reference).

In the design of a new universal remote control device, a knowledge of codeset information for communicating with and controlling all the various different electronic consumer devices that the universal remote control device might be made to control is of significant value. Accordingly, companies involved in the manufacture of universal remote control devices and/or components for universal remote control devices have devoted years of effort and considerable expense to amassing large and comprehensive databases of codesets. The amassing of such a codeset database represents a considerable investment. A new way of exploiting a codeset database and codeset information is desired.

SUMMARY

In one novel aspect, a native application includes codeset information as well as a program portion. The novel native application is usable to store codeset information, to communicate codeset information, to advertise and supply and sell codeset information, and to receive codeset information into a remote control device such that the codeset information is then usable to generate operational signals.

In one novel method, an on-line media store provides and advertises the novel native application for purchase and download. A user of an web-enabled cellular telephone uses the cellular telephone to surf the web, to access the website of the on-line media store, to view representations of many native applications that are available for purchase and download, to select one of the novel native applications, to purchase the selected novel native application, and to download the novel native application across the internet and/or cellular telephone network into the user's cellular telephone. In one example, the cellular telephone has web surfing capability, but does not have a mechanism suitable for converting codeset information into IR operational signals of the type used to control common electronic consumer devices. A novel Operational Signal Generating Device (OSGD) is therefore provided and is coupled to the cellular telephone. The OSGD has a microcontroller integrated circuit that can use codeset information to generate electrical signals for driving IR LEDs such that proper IR operational signals are transmitted from the IR LEDs. The codeset information used in the this process is stored in FLASH memory on the microcontroller integrated circuit. The microcontroller is powered by the cellular telephone.

After the native application has been downloaded into the cellular telephone, some or all of the codeset information of the native application is transferred from the cellular telephone into the memory of the microcontroller integrated circuit within the OSGD. The codeset information is then usable by the microcontroller to generate IR operational signals. If the user wishes to use the cellular telephone/OSGD assembly to generate IR operational signals (for example, to control a television or other electronic consumer device), the user presses on an icon on the touch screen display of the cellular telephone. In response, a keypad of a remote control device is then displayed on the display. The various keys of the keypad may, for example, include a power on/off key, and volume up key, a volume down key, a channel up key, a channel down key, and so forth. The user then presses a desired key. The cellular telephone detects the key press and in response sends the OSGD a communication which in turn causes the microcontroller to use the codeset information to generate an appropriate signal that drives the IR LEDs of the OSGD such that an IR operational signal is transmitted from the OSGD.

If, for example, the user were to press a power on/off key on the touch screen display of the cellular telephone, then the IR operational signal that is transmitted from the OSGD would carry the power on/off code that is understood by the receiving electronic consumer device. The electronic consumer device would receive the IR operation signal and in response would toggle its power state. If the electronic consumer device were powered off, then the electronic consumer device would be powered on. If the electronic consumer device were powered on, then the electronic consumer device would be powered off. In this way, the cellular telephone/OSGD assembly functions as an IR remote control device. The cellular telephone portion provides a keypad and key press detect mechanism, whereas the OSGD stores the codeset information and provides a mechanism for using the codeset information to generate proper IR operational signals in response to detected key presses.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
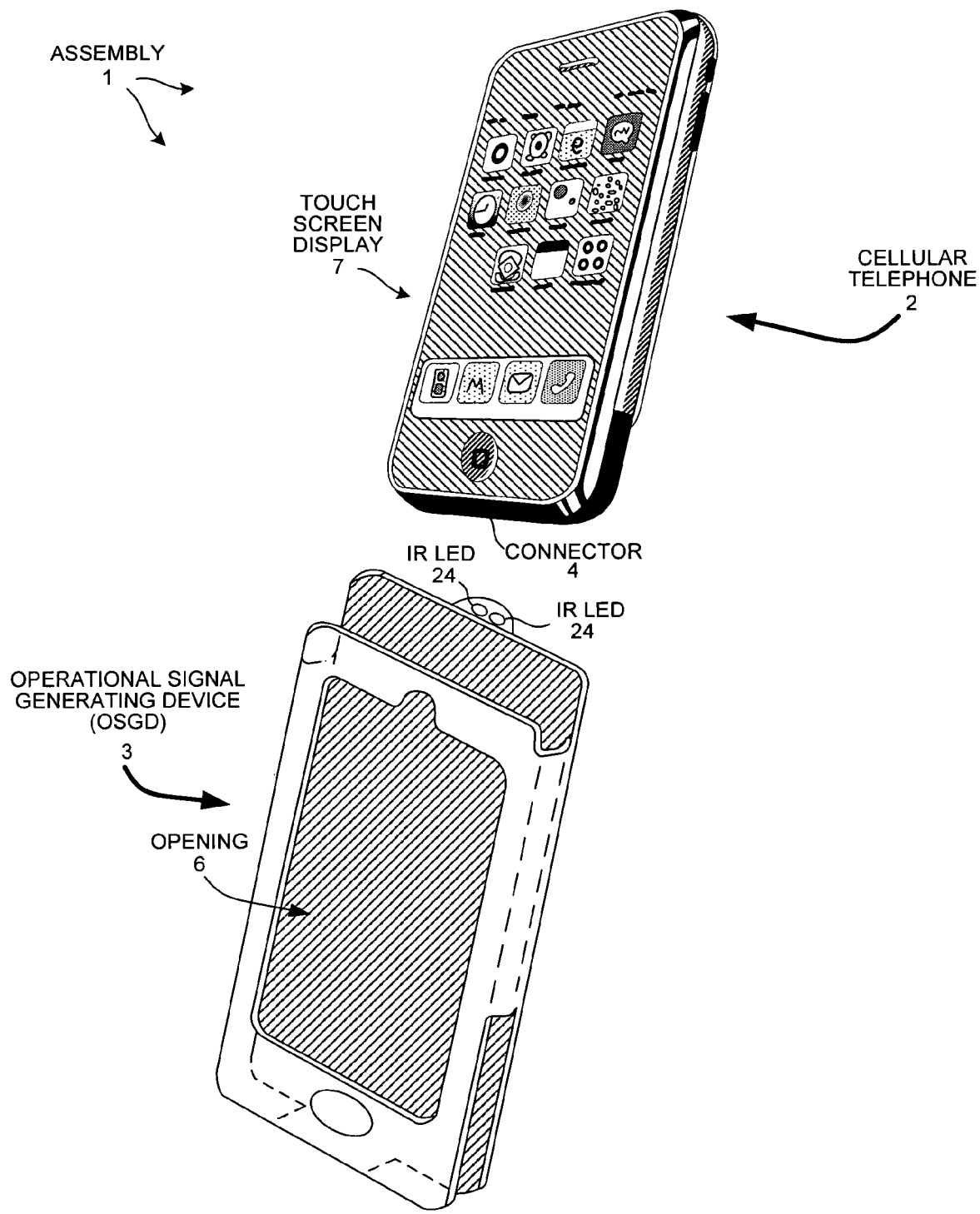
FIG. 1 is an exploded perspective view of a novel infrared (IR) enabled cellular telephone assembly.

FIG. 1 is an exploded perspective view of a novel infrared (IR) enabled cellular telephone assembly 1. Assembly 1 includes a cellular telephone 2 and a novel Operational Signal Generating Device (OSGD) 3. In the present example, the OSGD is in the form of a sleeve that is dimensioned to accommodate and slidingly engage cellular telephone 2. Cellular telephone 2 can be slid down through an opening in the top of the sleeve until a connector 4 on the bottom of the cellular telephone engages a corresponding connector 5 (not shown, see FIG. 2) on the inside of the bottom of the sleeve. Cellular telephone 2 can slidingly engage OSGD 3 in this fashion such that the connectors 4 and 5 mate. Cellular telephone 2 can also be slid upward with respect to the sleeve so that it slidingly disengages OSGD 3 and such that connectors 4 and 5 disconnect from one another. In the particular example of the OSGD 3 illustrated in FIG. 1, the front major side of OSGD 3 has an opening 6. Opening 6 allows a touch screen display 7 of cellular telephone 2 to be visible and exposed to a user when cellular telephone 2 is disposed in OSGD sleeve 3. A user who is using cellular telephone 2 can press on, view, and otherwise interact with the touch screen display 7 due to and through opening 6.

Figure 2:
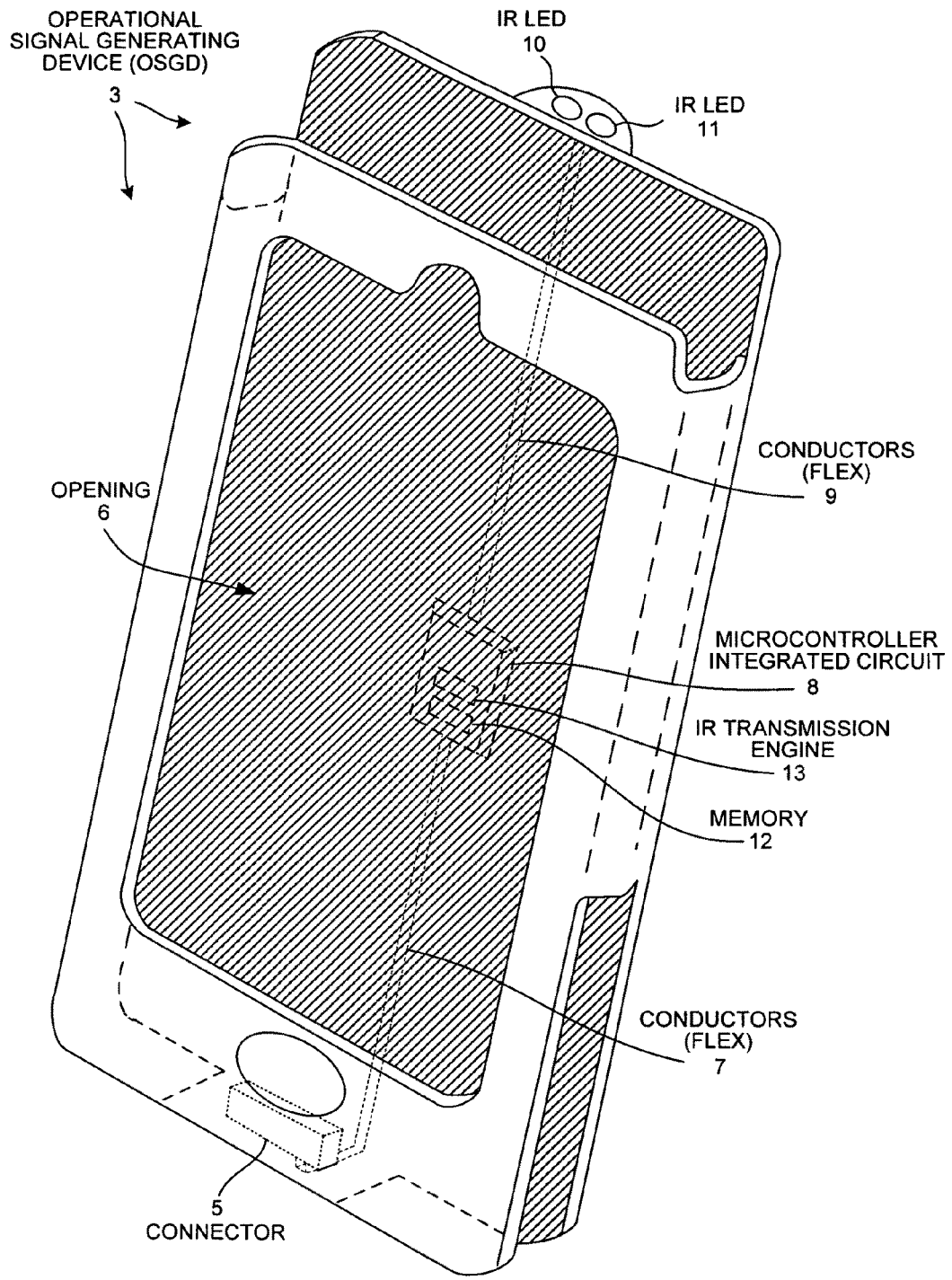
FIG. 2 is a larger perspective view of the Operational Signal Generating Device (OSGD) 3 of the assembly of FIG. 1.

FIG. 2 is a larger perspective view of OSGD 3. The back major side of OSGD 3 includes a first set of conductors 7 that extend from connector 5 to a microcontroller integrated circuit 8. The OSGD 3 also includes a second set of conductors 9 that extend from the microcontroller integrated circuit 8 to a pair of infrared (IR) light emitting diodes (LEDs) 10 and 11 as illustrated. The first and second sets of conductors 7 and 9 may, for example, be realized as a flexible printed circuit. In the present example, microcontroller integrated circuit 8 is a type of microcontroller that is commonly used in universal remote control devices to detect key presses, and to respond to such key presses by using a codeset stored in memory 12 in combination with an IR transmission engine 13 to generate drive signals for driving an IR LED such that an IR operational signal corresponding to the particular key pressed is transmitted from the IR LED. In one example, the IR transmission engine 13 is an amount of firmware machine code which when executed exercises function-specific hardware of the microcontroller to convert a mark/space table and a string of timing information into the IR operational signal. The string of timing information and the mark/space table are considered parts of a codeset. Alternatively, the IR transmission engine 13 uses a table of keycode data and system code data and other protocol and timing information to generate the IR operational signal. The keycode data, system code data, and other protocol and timing information are considered parts of a codeset. Codeset information can also be stored in other formats, including proprietary formats and encrypted formats. In the present example, microcontroller integrated circuit 8 is powered by cellular telephone 2 via connectors 4 and 5.

Regardless of the format of the codeset information, multiple codesets can be loaded into and stored in memory 12. In one example, memory 12 is FLASH memory. One example of a microcontroller integrated circuit 8 is the ZLFBLST0H2064G (IR Blaster) available from Zilog, Inc. of San Jose, Calif.

In an ordinary IR remote control device, the microcontroller integrated circuit of the remote control device would typically scan the keys of a keypad of the remote control device and respond to a detected key press by accessing a selected codeset and generating an IR operational signal associated with the particular key pressed. In the OSGD 3 of FIG. 2, however, the microcontroller integrated circuit 8 does not perform key scanning operations and does not generate IR signals in response to such a key scan. Rather, microcontroller integrated circuit 8 responds to communications received from cellular telephone 2 via connectors 4 and 5 and conductors 7. One such communication is an instruction to the microcontroller integrated circuit 8 to load one or more codesets that are serially supplied from cellular telephone 2 via connectors 4 and 5 and conductors 7. This instruction instructs the microcontroller to load these codesets into memory 12. A second communication is an instruction to microcontroller integrated circuit 8 to use one particular codeset of the many possible codesets stored in memory 12 in the generation of subsequent IR operational signals. A third communication is an instruction to generate an operational signal that carries a particular keycode, where the operational signal is generated using the selected particular codeset. The communications are communicated serially from cellular telephone 2 to OSGD 3 using a serial bus protocol and connectors 4 and 5.

Figure 3:
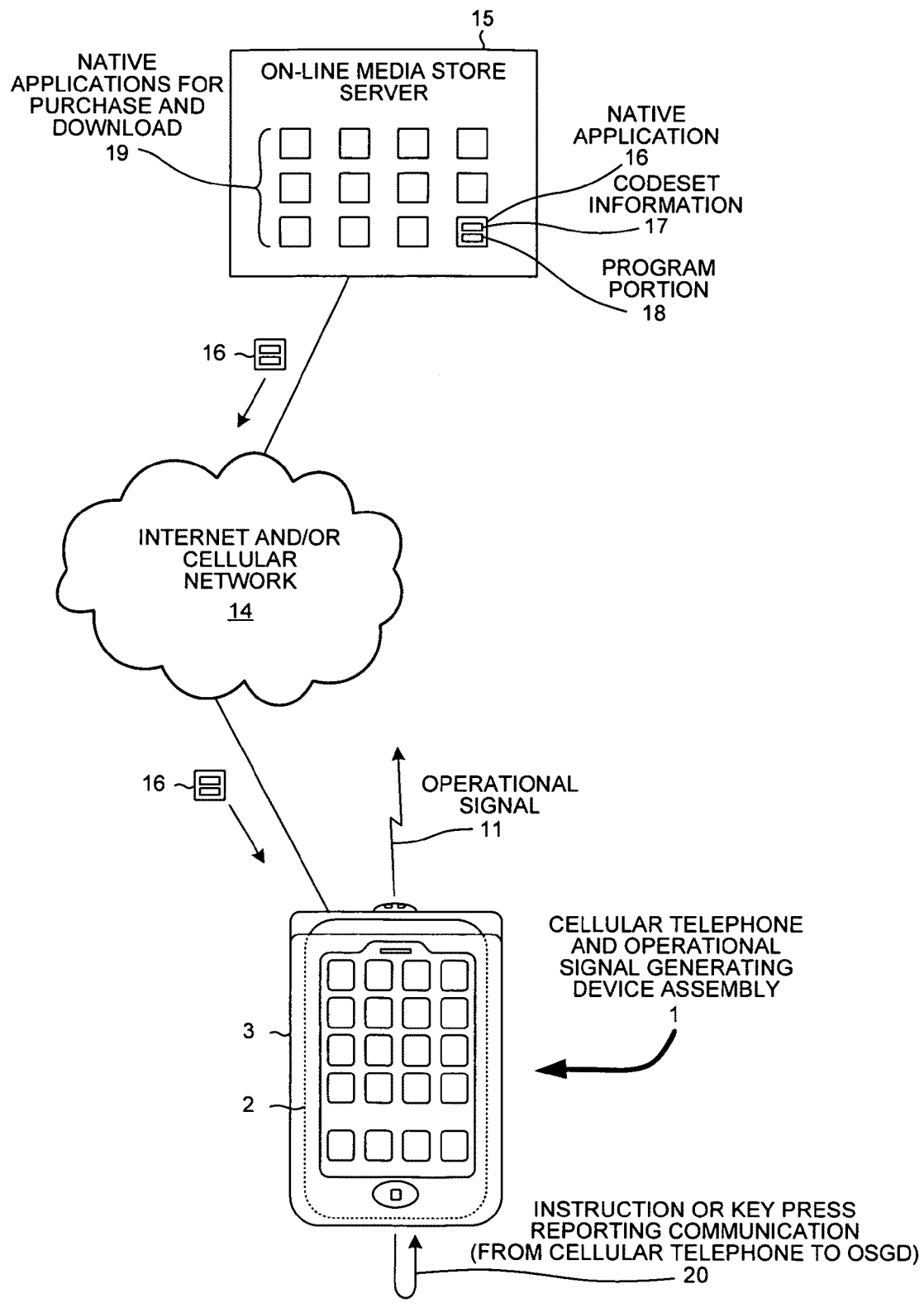
FIG. 3 is a diagram that illustrates a novel method involving the assembly 1 of FIGS. 1 and 2.
Figure 4:
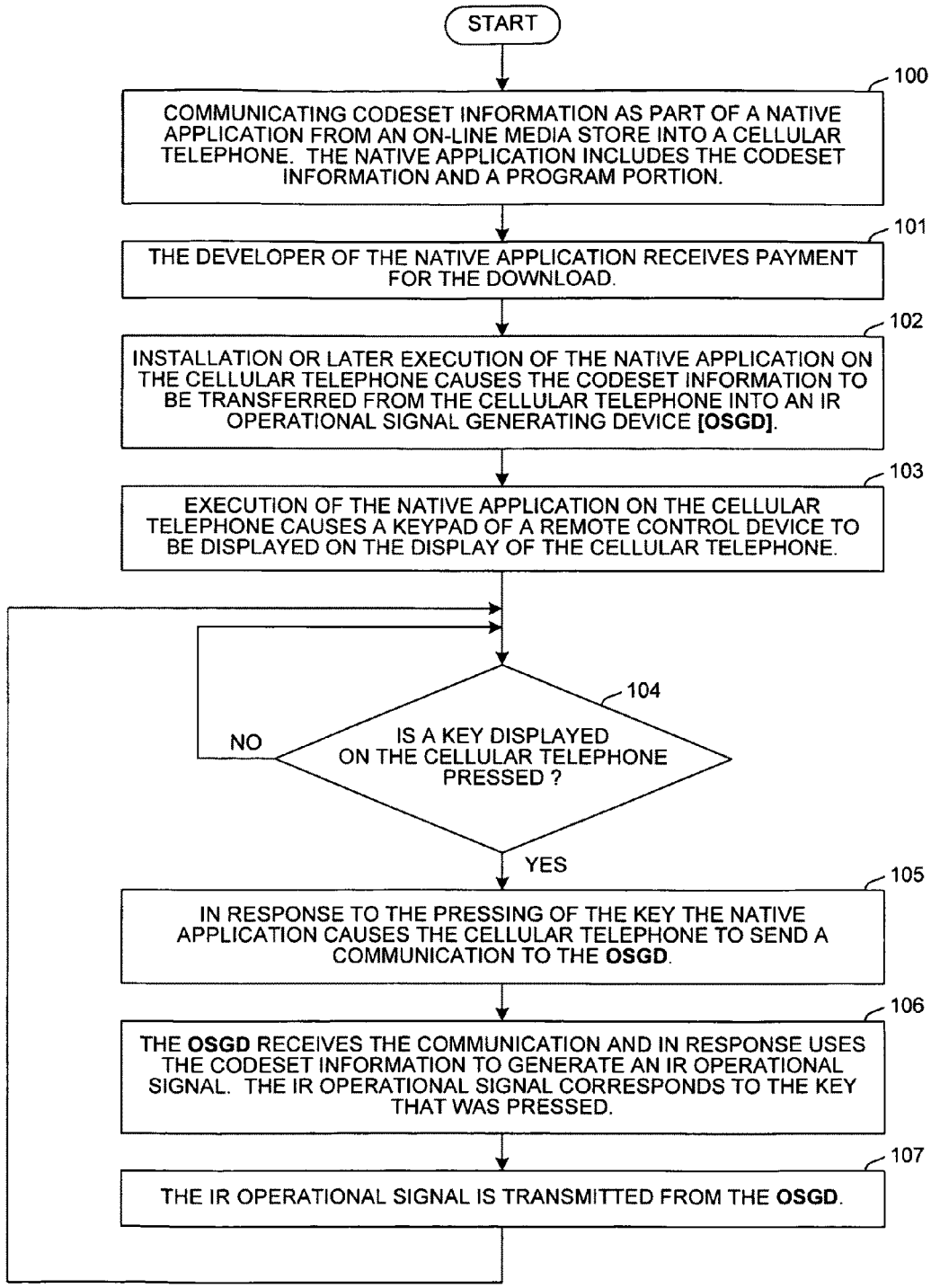
FIG. 4 is a flowchart of some of the steps of the novel method illustrated in FIG. 3.

FIG. 3 is a diagram that illustrates a novel method involving the assembly 1 of FIGS. 1 and 2. FIG. 4 is a flowchart of some of the steps of the method.

An on-line media store is accessible via the internet 14 and is served by an on-line media store server 15. In the present example, the on-line media store is the well-known iTunes web site maintained by or for Apple Computer, Inc. of Cupertino, Calif. A portion of the iTunes web site is the so-called "App Store". In the present example, cellular telephone 2 is a so-called "iPhone" available from Apple Computer, Inc. of Cupertino, Calif. A user of the iPhone cellular telephone 2 can browse the internet using iPhone cellular telephone 2, access the so-called iTunes on-line media store, access the "App Store", and view a list of advertised "native applications" or so-called "iPhone applications" 19 using display 7 of the iPhone cellular telephone 2. The "App Store" makes these advertised native applications 19 available for purchase and download. The user can select one of these native applications using iPhone cellular telephone 2, and download the selected native application from the App Store into cellular telephone 2 via the internet and/or cellular network. The last communication link to the iPhone cellular telephone 2 may be a wireless cellular telephone communication link or may be a hardwired network link. Once the native application is present on cellular telephone 2, the native application is installed on the operating system of the cellular telephone 2. Once installed, the native application can be executed. The native application is "native" in that its program code is machine code that executes directly on the processor of the cellular telephone. The instructions of the native application are not high level script instructions that must be interpreted by any intervening interpreter or browser running on the operating system. The native application is compiled into machine code that executes directly on the processor.

In the novel method of FIGS. 3 and 4, a native application 16 includes codeset information 17 as well as a program portion 18. The user of cellular telephone 2 uses touch screen display 7 of cellular telephone 2 to select advertised native application 16 from the many native applications 19 that are available for purchase and download. The user pays the on-line media store operator by some mechanism (for example, by credit card), and then downloads (step 100) the selected native application 16 via the internet and cellular network 14 into cellular telephone 2 in the same fashion that other native applications are conventionally purchased and downloaded from the "App Store". For additional information on an online media store and related methods, see: U.S. Patent Application Publication No. US2006/0095339, assigned to Apple Computer, Inc., and published May 4, 2006 (the entire subject matter of which is incorporated herein by reference). In one example, a portion of the user's payment is at that time, or is later, supplied to the developer or author of the native application (step 101), whereas another portion of the payment is retained by the operator or provider of the on-line media store.

The user's cellular telephone 2 is coupled to OSGD 3 to form assembly 1 as set forth above in connection with FIGS. 1 and 2. Once the native application 16 is downloaded and present in cellular telephone 2, the native application 16 is installed on the operating system of the cellular telephone 2. As a consequence of this installation, or as a consequence of later execution of the native application 16, the codeset information portion 17 or a portion of the codeset information portion 17 is transferred from cellular telephone 2, through connectors 4 and 5, through conductors 7, and into memory 12 of microcontroller integrated circuit 8. Microcontroller integrated circuit 8 receives the codeset information via conductors 7 and loads the codeset information into memory 12 (step 102) such that the codeset information can later be used by IR transmission engine 13 in the generation of IR operational signals.

In one example, the codeset information portion 17 of the native application 16 includes a set of associated codesets. An example of one such set of associated codesets is all codesets for controlling all the televisions made by a particular manufacturer. During the installation process, the user is queried by display 7 to identify the particular model of television that user wishes to control using assembly 1. The user uses touch screen display 7 to select the desired model from a list of models of televisions made by the manufacturer. Once the selection is made, the cellular telephone 2 informs the OSGD of the codeset for the selected electronic consumer device so that microcontroller integrated circuit 8 will thereafter use the appropriate codeset in the generation of subsequent IR operational signals. In one example, only the codeset selected by the user is actually loaded into OSGD 3, whereas in another example all the codesets are loaded into OSGD 3 but the cellular telephone 2 informs to the OSGD 3 only to use the selected codeset in the generation of subsequent IR operational signals.

Assembly 1 is then ready for use in generating IR operational signals to control the selected electronic consumer device. An icon representing the native application 16 appears on the touch screen display 7. If the user wishes to use assembly 1 to generate IR operational signals to control an electronic consumer device, then the user presses the icon. Pressing the icon launches execution of native application 16 which in turn causes a keypad of a remote control device to be displayed (step 103) on the touch screen display 7. The keypad of the remote control device may, for example, resemble the remote control device originally supplied by the electronic consumer device manufacturer along with the electronic consumer device.

If the user then presses a key of the displayed keypad (step 104), then cellular telephone 2 sends OSGD 3 a communication 20 (step 105). Communication 20 causes OSGD 3 to use the previously selected codeset information to generate an operational signal for the particular key that was detected to have been pressed on the cellular telephone (step 106). If, for example, the user presses a power on/off key displayed on touch screen display 7, then cellular telephone 2 sends OSGD a communication that causes IR transmission engine 13 of microcontroller 8 to generate the power on/off keycode IR operational signal. Microcontroller integrated circuit 8 drives IR LEDs 10 and 11 such that the resulting power on/off IR operational signal 11 is transmitted (step 107) from IR LEDs 10 and 11. Accordingly, assembly 1 is usable as an IR remote control device, with the cellular telephone portion serving as the keypad and key press detecting mechanism, and with the OSGD portion serving as the codeset storage/operational signal generation/IR transmission mechanism.

Examples of a computer-readable medium that can store a native application including its program portion include, but are not limited to, FLASH memory, static random-access memory, read-only memory, optical data storage devices, CD-ROMs, DVDs, magnetic hard disks, and memory cards. The computer-readable medium can also be distributed over network-coupled computer systems so that the computer-executable instructions are stored and executed in multiple different devices in a distributed fashion.

In one example, the microcontroller integrated circuit 8 is of a type that is mass produced for use in several other universal remote control applications. Due to the mass production of the microcontroller for other purposes, the unit cost of providing the microcontroller in the OSGD is advantageously reduced.

Although the present invention is described in connection with certain specific embodiments for instructional purposes, the present invention is not limited thereto. Although in the above described embodiment the operational signal is an infrared (IR) operational signal, the operational signal in other embodiments is another type of signal such as, for example, a radio frequency (RF) signal. Although in the above-described embodiment the cellular telephone is able to generate operational signals due to the provision of the associated OSGD 3, in other embodiments the functionality of the OSGD is integrated into the cellular telephone. Although in the above-described embodiment a mass produced, specialized and inexpensive microcontroller is provided to generate operational signals from codeset information, such a special microcontroller need not be provided. In other embodiments the CPU of the cellular telephone generates operational signals from the codeset information where the codeset information is received onto the cellular telephone as part of a native application. The novel aspect of a native application that includes codeset information is not limited to usage by a user of an operational signal generating assembly, but rather extends to all usages of such a novel native application, including the communication of codeset information from one location to another as part of a native application, and including the advertising and supplying and sale of codeset information as part of a native application. Although in the above-described embodiment the cellular telephone has a touch screen display, the novel method described above can be carried out with cellular telephones that do not have such touch screen displays. Rather than the user pressing keys that appear on a touch screen display, hard keys of a cellular telephone are used to detect user key presses. The display of the cellular telephone is made to display a correspondence between remote control keys and the hard keys of the cellular telephone. The user uses this displayed correspondence to determine which hard key to press. Although in the above-described embodiment the cellular telephone sends the OSGD an instruction that instructs the OSGD to generate a particular IR operational signal, the cellular telephone may simply detect key presses and send a key press reporting communication to the OSGD. The OSGD may determine from this communication how to respond and whether to generate an IR operational signal and what IR operational signal to generate.

In one example, a remote control device has no display at all but does have the capacity to receive codeset information. The codeset information is received onto this remote control device through a personal computer or other web-enabled device. The web-enabled device is used to access the on-line media store and to download codeset information from the on-line media store. The codeset information is then downloaded from the web-enabled device into FLASH memory of an IR blaster microcontroller in the remote control device. Once downloaded, the remote control device can generate IR operational signals using the downloaded codeset information. Accordingly, the function of cellular telephone 2 can be generalized. Any suitable device that can access the on-line media store and can download native applications containing codeset information can be used. Also, the function of OSGD 3 can be generalized. Any suitable device that can receive the downloaded codeset information and generate therefrom an IR operational signal can be used. Various modifications, adaptations, and combinations of various features of the described embodiments can be practiced without departing from the scope of the invention as set forth in the claims.

What is claimed is:

1. A method for using a mobile device having a display and a signal generating device communicatively coupled with the mobile device to control an appliance, comprising:
    installing on the mobile device a native application, wherein the native application comprises programming for providing a graphical user interface for display on the display of the mobile device and a plurality of codesets including an identified codeset for use in transmitting control communications to the appliance wherein the code set for use in transmitting control communications to the appliance is identified in the plurality of codesets by input received during installation of the native application on the mobile device;
    transferring the identified codeset from the mobile device to the signal generating device and wherein the transferred codeset comprises at least one code and at least one of protocol, timing, carrier, and framing information for generating an operational signal that includes the at least one code; and
    using the transferred codeset at the signal generating device to transmit a control communication to the appliance wherein the control communication transmitted to the appliance by the signal generating device corresponds to an interaction with the graphical user interface when displayed on the display of the mobile device as indicated to the signal generating device via a data transmission originating from the mobile device and received by the signal generating device.

2. The method as recited in claim 1, wherein the method further comprised downloading the native application from an on-line media store.

3. The method as recited in claim 1, wherein the mobile device comprises a cellular phone.

4. The method as recited in claim 1, wherein the method further comprises transferring each of the plurality of codesets to the signal generating device during the step of installing the native application.

5. The method as recited in claim 1, wherein the data transmission comprises an instruction for the signal generating device to use the transferred codeset to generate a particular control communication.

6. The method as recited in claim 1, wherein the data transmission comprises data indicative of an icon of the graphical user interface interacted with.

7. The method as recited in claim 1, wherein the signal generating device is removeably couplable with the mobile device.

8. The method as recited in claim 1, wherein the method further comprises storing the transferred codeset in a memory of the signal generating device.

9. A system, comprising:
    a mobile device having a display; and
    a signal generating device communicatively coupled with the mobile device having a transmission circuit and associated programming for issuing control communications to control an appliance;
    wherein the mobile device has programming for:
    installing on the mobile device a native application, wherein the native application comprises programming for providing a graphical user interface for display on the display of the mobile device and a plurality of codesets including an identified codeset for use in transmitting control communications to the appliance wherein the codeset for use in transmitting control communications to the appliance is identified in the plurality of codesets by input received during installation of the native application on the mobile device; and
    transferring the identified codeset from the mobile device to the signal generating device whereupon the transferred codeset of the native application is used at the signal generating device to transmit a control communication to the appliance with the control communication transmitted to the appliance by the signal generating device corresponding to an interaction with the graphical user interface when displayed on the display of the mobile device as indicated to the signal generating device via a data transmission originating from the mobile device and received by the signal generating device and wherein the transferred codeset comprises at least one code and at least one of protocol, timing, carrier, and framing information for generating an operational signal that includes the at least one code.

10. The system as recited in claim 9, wherein the native application is downloaded from an on-line media store.

11. The system as recited in claim 9, wherein the mobile device comprises a cellular phone.

12. The system as recited in claim 9, wherein each of the plurality of codesets is transferred to the signal generating device when the native application is installed on the mobile device.

13. The system as recited in claim 9, wherein the data transmission comprises an instruction for the signal generating device to use the transferred codeset to generate a particular control communication.

14. The system as recited in claim 9, wherein the data transmission comprises data indicative of an icon of the graphical user interface interacted with by a user.

15. The system as recited in claim 9, wherein the signal generating device is removeably couplable with the mobile device.

16. The system as recited in claim 9, wherein the transferred codeset is stored in a memory of the signal generating device.

* * * * *